Nov. 8, 1949     P. F. HURST     2,487,554
FIRE AND HEAT INSULATING PROTECTIVE SHEATH
OR SLEEVE FOR FLEXIBLE PIPES AND THE LIKE
Filed March 14, 1947
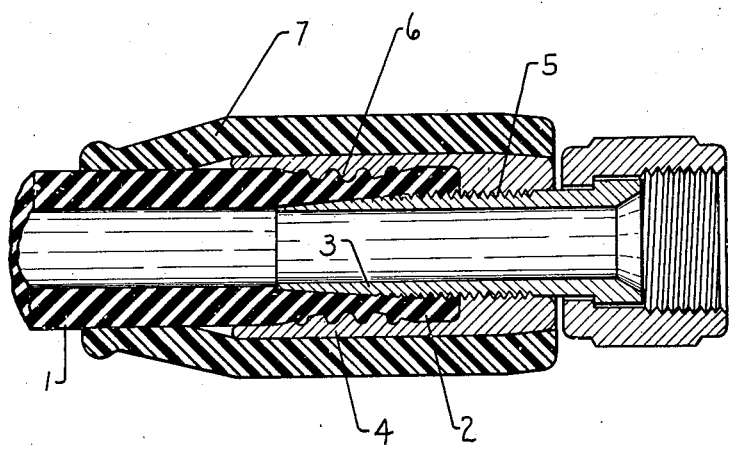
Inventor
PETER F. HURST
By Beaman & Patch
Attorneys Patented Nov. 8, 1949

2,487,554

UNITED STATES PATENT OFFICE 2,487,554

FIRE AND HEAT INSULATING PROTECTIVE SHEATH OR SLEEVE FOR FLEXIBLE PIPES AND THE LIKE

Peter F. Hurst, Jackson, Mich., assignor to Aeroquip Corporation, Jackson, Mich., a corporation of Michigan Application March 14, 1947, Serial No. 734,814

1 Claim. (Cl. 285—14)

This invention relates to hose or pipe lines, such as are employed to convey liquids or fluids and which are formed from sections of flexible material such as rubber, rubber composition or some other suitable flexible material which is usually reinforced with fibre and/or wire braids embedded in the material of the hose or pipe and the extremities of which latter incorporate metal end fittings by which the adjacent flexible hose or pipe sections can be coupled together, the terminal ends of the hose or pipe sections being secured upon their respective metal end fittings by their being squeezed or compressed between inner and outer metal heat conducting end portions of the end fittings, or by their being stretched over the latter.

More particularly, the invention is concerned with flexible hose or pipe lines of the character mentioned which are employed in the aircraft industry to convey the fuel, the lubricating oil, the coolant fluids, or the hydraulic medium of a hydraulic pressure system embodied in the aircraft.

In connection with such hoses or pipe lines, the problem arises that in the event that the same is subjected externally to the influence of excessive heat in the vicinity of a metal end fitting, as upon the outbreak of a fire in an aircraft incorporating the hose or pipe lines, the metal of the end fitting conducts the heat to the neighboring and already deformed or compressed terminal ends of the flexible hose or pipe sections, such that the effectiveness of the joint between the metal end fitting and the hose is destroyed and leakage of the pressure medium normally conveyed in the hose or pipe line occurs.

The present invention has for its object to overcome this risk of leakage in a practical and efficient manner and the invention is based upon the results of considerable and exhaustive tests carried out on the different types of flexible hoses or pipes at present in use in the aircraft industry in particular, and which incorporated the conventional type of metal end fittings above mentioned.

For instance, in the aircraft industry, where it is customary to employ flexible hoses with metal end fittings secured in position in the manner described, it is necessary in actual practice that the hoses which convey the fuel, lubricating oil and hydraulic pressure medium should be capable of withstanding temperatures in the neighborhood of 2000° F. for periods of time of from five to thirty minutes. Since a practical requirement is that the metal end fittings (forming part of the means for coupling adjacent hose sections together) should be made from aluminum alloy and the temperatures mentioned are in excess of the melting point of such metal or alloys, and since the customary methods of securing the metal end fittings to the hose sections involves a deformation (as by stretching or squeezing) of the material of the hose sections and the presence of the metal of the end fittings as an interior lining to the corresponding end portions of the hose sections, it has previously happened, in practice, that this excessive heating of the metal end fittings, as by the occurrence of a fire in the aircraft, gives rise to a weakening of the fluid-tight joint normally provided between the end fittings and the hose sections and this with the serious consequence that the liquid or fluid conveyed within the hose sections leaks. It may be pointed out here that the employment of end fittings made from a metal, such as steel, which would withstand temperatures in excess of 2,000° F. would not meet the problem involved since the tests carried out and referred to hereinafter showed beyond doubt that the fluid-tight joint was destroyed at the given temperature whether aluminum alloy or steel was employed.

The accompanying drawing, which is a longitudinal section of one practical form of the invention, by way of example only, with the hose section broken away for ease of illustration, shows one way by which the serious objection to the existing flexible pipe or hose constructions can be overcome in a practical and highly efficient manner, arrived at, however, only after prolonged and exhaustive tests.

Referring to the drawing, the flexible pipe or hose section 1, formed from rubber, rubber composition or like material and which is usually reinforced by wire embedded therein, has its end portion 2 secured, by squeezing or compressing in the annular space formed between an internal metal nipple 3 and an external concentric metal sleeve 4, both of which are co-axial with the hose 1 and combine to form a metal end fitting as above described.

The outer sleeve 4 has a screw-threaded connection with the inner nipple 3, as indicated at 5 and, preferably, the outer sleeve also has a screw-threaded connection with the end portion 2 of the hose, as indicated at 6. Other means may be employed, however, to secure the required connection, which is such, however, as involves a squeezing, or compressing, or a stretching of the material of the end portion of the flexible hose in order that the required fluid-tight joint may be made between the hose and the metal end fitting. Either method of connection, however, renders it necessary that the material of the hose at the joint should be protected against deterioration, or shrinkage, due to heating of the metal of the end fitting and, accordingly, such heating is avoided by enclosing at least the outer metal sleeve 4 in a sheath or sleeve 7 of a fire resisting and heating insulating material.

This sheath or sleeve could be moulded to shape so that it can be slipped over the metal sleeve 7 and maintain a friction tight grip thereon or it is possible to sever the sheath or sleeve from endless tubing formed from the desired fire resisting and heat insulating material.

The sheath or sleeve 7 is made from a synthetic rubber known under the registered trademark "neoprene" asbestos fibres incorporated therewith, prior to moulding of the sheath or sleeve.

Also, although it is essential that the outer metal sleeve should be protected, in some cases it may be preferred that the protecting sleeve should also extend along a part or along the entire length of the flexible hose 1 itself and may, for instance, extend as a continuous sleeve enclosing metal end fittings secured at apposite ends of the flexible hose.

Further, although in the particular example illustrated, the end portion of the flexible hose is shown secured to a metal end fitting involving inner and outer portions (the inner nipple 3 and the outer sleeve) the invention can be applied with like effect and advantage to an alternative type of metal end fitting which requires that the end portion of the flexible hose should be stretched over the outside of a nipple-like metal tube section, constituting the metal end fitting.

Results of tests carried out by the inventor in order to find a satisfactory and practical solution to the objections above mentioned as existing in the normal and previously adopted hose constructions are as follows:

FIRE RESISTANCE HOSE ASSEMBLIES WITH AND WITHOUT FIREPROOF SLEEVE

A series of fire tests were made to determine the fire resistant qualities of single wire braid hose lines with the metal end fittings covered with short pieces of fire resisting and heat insulating sleeves of rubber having asbestos fibres incorporated therein. A preliminary check had indicated that more than adequate fire protection would be obtained, a fact which was confirmed without exception by the tests. After presenting an outline of the test procedure, this report will tabulate the results of the tests and discuss these results and the conclusions to be drawn therefrom. The results of tests which were run on hose assemblies without the fire resisting and heat insulating sleeves under identical operating conditions, are also presented to indicate the extent to which the fire resistant and heat insulating qualities had been enhanced by the use of the fireproof sleeve.

TEST PROCEDURE

In general, this series of tests followed the requirements of the Civil Aeronautics Authority fire resistant specification which are as follows:

Flame temperature, 2000 ± 100° F.
Oil circulation as follows:
    Type, SAE 20 oil
    Temperature, 250° F.
    Pressure, 25 lbs. per square inch
Flow rates:

| Dash Size | Nominal I. D., in. | Flow. g. p. m. |
|---|---|---|
| −6 | 5/16 | 1.2 |
| −8 | 13/32 | 1.6 |
| −12 | 5/8 | 3.3 |
| −16 | 7/8 | 6.1 |
| −24 | 1 3/8 | 14.3 |

It is required that a coupling assembly should withstand a five minute exposure without leakage or failure.

It was impossible to obtain the 250° F. oil temperature required by the specification with available facilities. Oil temperatures actually ran between 100° and 160° F. with a tendency to average near to 150° F.

The flame was obtained with a "Littleford" No. 5 kerosene vaporizing torch type burner which produced a 2000 ± 100° F. flame. The kerosene was burned at the rate of 2½ g. p. h. and the flame was approximately 5 in. in diameter. In all tests the flame was centered at the junction of a metal end fitting with its hose section, which was attached to the head of a vibrating machine in such a manner as to permit circulation of the oil. The amplitude of vibration was 3/8 in. at a rate of 1725 cycles per minute. Vibration was not a requirement of the CAA specification. It was introduced to check the ability of the sleeve to remain intact after prolonged exposure to the flame, since protection would be lost if the fire resisting and heat insulating sleeve disintegrated and left the end fitting exposed.

Oil flow was measured with a standard multiple orifice test pipe which was directly calibrated for the SAE 20 oil at a temperature of 150° F. The use of the proper orifice to suit the flow rate permitted a close determination of the flow of oil, which was maintained with suitable pumping equipment. Pressure was maintained at 25 lbs. per square inch at the inlet to the hose assembly, corresponding to the point of attachment of the connection to a suitable gage.

The flame temperature was checked occasionally with a chromelalumel thermocouple and a directly calibrated indicating potentiometer. Previous experience had indicated that the flame temperature was constant so long as the kerosene tank pressure was maintained at the proper value. This was accomplished with a properly regulated compressed air supply.

In each test run, the oil flow rate was adjusted to the proper value and the flame lowered to position at zero time, when the electric timer was started. The run was continued until (1) a slight leakage was apparent, (2) complete failure occurred, or (3) 10 minutes time had elapsed. Some tests were continued beyond this limit to indicate that fire resistance was maintained over a period greatly exceeding the 10 minute interval selected for the test.

TEST RESULTS

To facilitate comparison, results of corresponding tests in a given size will be presented together, first those for assemblies without sleeves, then those for assemblies with sleeves. Since operating conditions were maintained within close limits to those desired, with the exception of oil temperature, this is the only variable to be tabulated in addition to time—the criterion of fire resistance.

⅜ inch size

| Sample No. | Oil Temp., °F. | Exposure Time, Sec. | Remarks |
|---|---|---|---|
| ALUMINUM ALLOY WITHOUT SLEEVE ||||
| 11 | 149 | 140 | Leak started. |
|  |  | 150 | Leak bad, flame off. |
| 1 | 122 | 275 | Leak started. |
|  |  | 475 | Leak bad, flame off. |
| 1 | 131 | 85 | Bad leak, socket partially melted. |
| 2 | 128 | 120 | Do. |
| 3 | 135 | 160 | Bad leak, hose loose in fitting. |
| STEEL WITHOUT SLEEVE ||||
| 13 | 150 | 34 | Hose blew out of fitting. |
| 2 | 115 | 75 | Leak bad, flame off. |
| 4 | 141 | 90 | Leak started. |
|  |  | 120 | Leak bad, flame off. |
| 5 | 150 | 85 | Leak started. |
|  |  | 148 | Leak bad, flame off. Hose loose in fitting. |
| 6 | 143 | 87 | Leak started. |
|  |  | 128 | Leak bad, flame off. Hose loose in fitting. |
| ALUMINUM WITH SLEEVE ||||
| 1 | 145 | 600 | No leakage. |
| 2 | 150 | 600 | Do. |
| 3 | 152 | 600 | Do. |
| 3 | 126 | 1,320 | Pinhole leak in hose 4″ from socket. |
| 4 | 150 | 33 min. | No leakage. |

½ inch size

| Sample No. | Oil Temp., °F. | Exposure Time, Sec. | Remarks |
|---|---|---|---|
| ALUMINUM WITHOUT SLEEVE ||||
| 4 | 157 | 35 | Leak started. |
|  |  | 75 | Bad leak, cont. to 460 sec. |
| 5 | 156 | 35 | Hose blew out of fitting. |
| 6 | 160 | 30 | Leak started. |
|  |  | 85 | Bad leak, cont. to 600 sec. |
| ALUMINUM WITH SLEEVE ||||
| 1 | 145 | 600 | No leakage. |
| 2 | 150 | 600 | Do. |
| 3 | 152 | 600 | Do. |

¾ inch size

| Sample No. | Oil Temp., °F. | Exposure Time, Sec. | Remarks |
|---|---|---|---|
| ALUMINUM WITHOUT SLEEVE ||||
| 4 | 140 | 72 | Hose blew out of socket. |
| 5 | 120 | 90 | Bad leak, flame off. |
| 6 | 120 | 85 | Do. |

¾ inch size—Continued

| Sample No. | Oil Temp., °F. | Exposure Time, Sec. | Remarks |
|---|---|---|---|
| ALUMINUM WITH SLEEVE ||||
| 7 | 131 | 600 | No leakage. |
| 8 | 141 | 600 | Do. |
| 9 | 147 | 600 | Do. |

1 inch size

| Sample No. | Oil Temp., °F. | Exposure Time, Sec. | Remarks |
|---|---|---|---|
| ALUMINUM WITHOUT SLEEVE ||||
| 4 | 130 | 110 | Leak started. |
|  |  | 250 | Bad leak, flame off. |
| 5 | 131 | 120 | Leak started. |
|  |  | 180 | Bad leak, flame off. |
| 6 | 132 | 110 | Leak started. |
|  |  | 160 | Bad leak, flame off. |
| STEEL WITHOUT SLEEVE ||||
| 7 | 128 | 115 | Leak started. |
|  |  | 180 | Bad leak, flame off. |
| 8 | 130 | 125 | Leak started. |
|  |  | 260 | Bad leak, flame off. |
| 9 | 133 | 130 | Leak started. |
|  |  | 285 | Leak bad, flame off. |
| ALUMINUM WITH SLEEVE ||||
| 4 | 141 | 600 | No leakage. |
| 5 | 147 | 600 | Do. |
| 6 | 148 | 600 | Do. |

1½ inch size

| Sample No. | Oil Temp., °F. | Exposure Time, Sec. | Remarks |
|---|---|---|---|
| ALUMINUM WITHOUT SLEEVE ||||
| 3 | 142 | 285 | Slight leak. |
|  |  | 600 | Leak continued, flame off. |
| 5 | 148 | 210 | Slight leak. |
|  |  | 600 | Leak continued, flame off. |
| 6 | 149 | 140 | Slight leak. |
|  |  | 600 | Leak continued, flame off. |
| 7 | 149 | 240 | Slight leak. |
|  |  | 600 | Leak continued, also pin hole in hose. |
| STEEL WITHOUT SLEEVE ||||
| 2 | 128 | 230 | Slight leak. |
|  |  | 830 | Leak continued, flame off. |
| 8 | 132 | 190 | Slight leak. |
|  |  | 600 | Leak continued, flame off. |
| 9 | 143 | 215 | Slight leak. |
|  |  | 330 | Bad leak. |
|  |  | 600 | Bad leak, flame off. |
| 10 | 140 | 225 | Slight leak. |
|  |  | 600 | Bad leak, flame off. |
| ALUMINUM ALLOY WITH SLEEVE ||||
| 1 | 108 | 430 | Pin hole in hose, 4″ from socket. |
| 4 | 149 | 600 | No leakage. |
| 11 | 141 | 600 | No leakage at fitting. |

In all cases, each sample on which the fire resisting and heat insulating sleeve was installed withstood the 10 minute exposure to 2000° F. flame without leakage at the fitting. One dash 12 test was stopped at 430 seconds because of a bad leak, which was found to be at a pinhole in the hose 4 inches from the socket.

Two dash 6 samples were exposed for longer periods. One failed after 22 minutes when leakage occurred in a pinhole in the hose 4" from the socket. The other run was discontinued after 33 minutes exposure with no leakage.

Attention is drawn to the fact that fire resistance is not improved with the use of steel fittings. In many cases exposure times before failure were less than those for aluminum fittings. This is probably due to the higher heat conductivity of the aluminum alloys which carry more heat from the socket into the nipples which are cooled by the flow of oil. The rate of penetration of heat to the hose under the socket is reduced and the period before the temperatures at which the synthetic compounds soften or char are reached is slightly prolonged. This prevents the loss of compression on which an effective seal is dependent.

CONCLUSIONS

The aforementioned test definitely indicates that the fireproof sleeve of rubber with asbestos fibres incorporated therein, when installed as a cover of sufficient length to cover the sockets of the fittings and to allow a 1/4" to 1/2" overhang on the hose, will provide more than adequate fire resistance and heat insulation. Exposure times were increased many fold for hose assemblies of the smaller sizes and more than doubled in the larger sizes up to dash 24, the largest tested.

Steel fittings were not superior in fire resistance to the standard aluminum fittings.

In connection with these tests it was observed that the performance of any metal end fitting was dependent upon its grip on the end of the hose and it was found that metals, such as aluminum, or steel, would, in the absence of the fire resisting and heat insulating sheath or sleeve, conduct sufficient heat to the portion of the hose confined within, or upon, the metal fitting as to char the cotton braid and/or the cover normally present on the type of hose employed and cause a state of permanent set to occur in the end portion of the hose and thereby destroy its resiliency, thereby giving rise to a leak. To eliminate the charring of the cotton braid, tests were carried out with metal end fittings designed to grip the wire braid of the hose directly. While these tests gave improved results, since one condition contributing to the relieving of the compression effect was eliminated, the effective heat transfer to the body of the hose itself was not reduced and sufficient "set" occurred as to relieve the compression and cause leakage.

Having thus described my invention, what I claim as new and desire to cover by Letters Patent is:

In a coupling for flexible hose having relatively low fire resisting properties wherein the hose is securely clamped between a socket and nipple constituting the coupling, means for reducing fire hazards due to overheating of the metal of the coupling comprising a sleeve of rubber-like material having asbestos fibres incorporated therein completely surrounding and tightly fitting the metal portion of the coupling and a portion of the hose adjacent thereto.

PETER F. HURST.

REFERENCES CITED

The following references are of record in the file of this patent:

UNITED STATES PATENTS

| Number | Name | Date |
| --- | --- | --- |
| 2,360,761 | Clickner | Oct. 17, 1944 |
| 2,371,971 | Main et al. | Mar. 20, 1945 |
| 2,383,733 | Parker | Aug. 28, 1945 |